US010501043B2

(12) United States Patent
Ghannam et al.

(10) Patent No.: US 10,501,043 B2
(45) Date of Patent: Dec. 10, 2019

(54) ASSEMBLY AND METHOD USING AN INFLATABLE DEVICE WITHIN A VEHICLE HAVING A DETACHABLE DOOR

(71) Applicant: Ford Global Technologies, LLC, Dearborn, MI (US)

(72) Inventors: Mahmoud Yousef Ghannam, Canton, MI (US); Mohamed Ridha Baccouche, Ann Arbor, MI (US); Saied Nusier, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 15/899,000

(22) Filed: Feb. 19, 2018

(65) Prior Publication Data
US 2019/0256037 A1    Aug. 22, 2019

(51) Int. Cl.
| B60R 21/231 | (2011.01) |
| B60J 5/04 | (2006.01) |
| B60R 21/04 | (2006.01) |
| B60R 21/015 | (2006.01) |
| B60R 21/013 | (2006.01) |
| B60R 21/21 | (2011.01) |
| B60R 21/02 | (2006.01) |

(52) U.S. Cl.
CPC ....... *B60R 21/23138* (2013.01); *B60J 5/0487* (2013.01); *B60R 21/013* (2013.01); *B60R 21/01544* (2014.10); *B60R 21/0428* (2013.01); *B60R 21/21* (2013.01); *B60R 2021/0246* (2013.01)

(58) Field of Classification Search
CPC .......... B60R 21/23138; B60R 21/0428; B60R 21/01544; B60R 21/013; B60R 21/21; B60R 2021/0246; B60J 5/0487
See application file for complete search history.

(56) References Cited

U.S. PATENT DOCUMENTS

| 4,850,636 A | 7/1989 | McLaren et al. |
| 5,224,733 A * | 7/1993 | Simsic .................... B60R 21/21 |
| | | 280/730.2 |
| 5,431,435 A * | 7/1995 | Wilson .................... B60R 21/21 |
| | | 280/728.1 |
| 5,524,924 A * | 6/1996 | Steffens, Jr. ............ B60R 21/21 |
| | | 280/730.2 |

(Continued)

FOREIGN PATENT DOCUMENTS

| DE | 19779632 C1 | 8/1998 |
| DE | 102007001781.4 A1 | 7/2008 |

*Primary Examiner* — Darlene P Condra
(74) *Attorney, Agent, or Firm* — Vichit Chea; Carlson, Gaskey & Olds, P.C.

(57) ABSTRACT

An exemplary vehicle assembly, includes, among other things, an inflatable device that transitions between a less expanded position and a more expanded position. The inflatable device in the more inflated position is disposed within a door opening of a vehicle. A side door of the vehicle is detached from the vehicle to provide the door opening. An exemplary occupant protection method includes, among other things, after a side door of a vehicle is detached from the vehicle to provide a door opening, transitioning an inflatable device from a less expanded position to a more expanded position. The inflatable device in the more inflated position is disposed within the door opening.

19 Claims, 7 Drawing Sheets

(56) References Cited

U.S. PATENT DOCUMENTS

| | | | |
|---|---|---|---|
| 5,647,609 A * | 7/1997 | Spencer | B60R 21/207 |
| | | | 280/730.1 |
| 6,609,054 B2 | 8/2003 | Wallace | |
| 7,357,415 B2 | 4/2008 | Enders et al. | |
| 7,686,379 B2 | 3/2010 | Lemieux | |
| 10,252,687 B1 * | 4/2019 | Tippy | B60R 21/0136 |
| 10,286,762 B2 * | 5/2019 | Ogawa | B60J 5/0456 |
| 2001/0033073 A1 | 10/2001 | Hammond et al. | |
| 2005/0052005 A1 * | 3/2005 | Lunt | B60R 21/21 |
| | | | 280/730.2 |
| 2006/0196715 A1 * | 9/2006 | Fujishiro | B60N 2/0276 |
| | | | 180/271 |
| 2013/0015644 A1 * | 1/2013 | Tamura | B60R 21/0428 |
| | | | 280/730.2 |
| 2013/0319785 A1 * | 12/2013 | Spindler | B62D 23/005 |
| | | | 180/292 |
| 2014/0197622 A1 * | 7/2014 | Muraji | B60R 21/23138 |
| | | | 280/730.2 |
| 2018/0170455 A1 * | 6/2018 | Carlson | B60J 7/10 |
| 2018/0297455 A1 * | 10/2018 | Hale | B60J 5/0476 |

* cited by examiner

ASSEMBLY AND METHOD USING AN INFLATABLE DEVICE WITHIN A VEHICLE HAVING A DETACHABLE DOOR

TECHNICAL FIELD

This disclosure relates generally to an inflatable device that can protect an occupant of a vehicle. More particularly, the disclosure relates to an inflatable device for use in a vehicle equipped with a detachable door when the detachable door is detached from the vehicle.

BACKGROUND

Some vehicles, particularly off-road vehicles, have detachable doors. When desired, the detachable doors can be detached from the vehicle leaving behind door openings. Some vehicles incorporate cage members into the door opening areas. Other vehicles omit the cage members entirely. The detachable doors could incorporate an inflatable device, but detaching the detachable doors from the vehicle removes the inflatable device from the vehicle.

SUMMARY

A vehicle assembly, according to an exemplary embodiment of the present disclosure includes, among other things, an inflatable device that transitions between a less expanded position and a more expanded position. The inflatable device in the more inflated position is disposed within a door opening of a vehicle. A door of the vehicle is detached from the vehicle to provide the door opening.

In a further non-limiting embodiment of the foregoing assembly, the inflatable device is mounted to a cage member that span from a front of the door opening to a rear of the door opening.

In a further non-limiting embodiment of any of the foregoing assemblies, the cage member includes no door panel and no window glass such that the door opening includes no door panel and no window glass when the side door is detached from the vehicle and replaced with the cage member.

In a further non-limiting embodiment of any of the foregoing assemblies, the cage member is a chain or a bar.

In a further non-limiting embodiment of any of the foregoing assemblies, openings in the cage member open to openings in the inflatable device to provide a plurality of paths for communicating a gas to an interior of the inflatable device. The gas transitions the inflatable device from the less expanded position to the more expanded position.

A further non-limiting embodiment of any of the foregoing assemblies includes a deployable assembly that transitions from a stowed position to a deployed position. The deployable assembly spans from a front side of the door opening to a rear side of the door opening when in the deployed position. The inflatable device is secured to the deployable assembly and is configured to transition with the deployable assembly from the stowed position to the deployed position.

In a further non-limiting embodiment of any of the foregoing assemblies, the deployable assembly in the stowed position is at least partially housed within a first recess on one of the front side or the rear side, and the deployable assembly in the deployed position is and least partially received within a second recess on the other of the front side or the rear side.

A further non-limiting embodiment of any of the foregoing assemblies includes a lid that covers the deployable assembly and the inflatable device within the first recess when the deployable assembly is in the stowed position.

In a further non-limiting embodiment of any of the foregoing assemblies, the deployable assembly is a telescoping assembly comprising segments that extend relative to each other as the deployable assembly moves from the stowed position to the deployed position. The inflatable device is secured to each of the segments.

In a further non-limiting embodiment of any of the foregoing assemblies, openings in the deployable assembly open to openings in the inflatable device to provide a plurality of paths for communicating a gas to an interior of the inflatable device. The gas transitions the inflatable device from the less expanded position to the more expanded position.

An occupant protection method according to another exemplary embodiment of the present disclosure includes, among other things, after a side door of a vehicle is detached from the vehicle to provide a door opening, transitioning an inflatable device from a less expanded position to a more expanded position. The inflatable device in the more inflated position is disposed within the door opening.

In a further non-limiting embodiment of the foregoing method, the inflatable device is mounted to a cage member that span from a front of the door opening to a rear of the door opening.

A further non-limiting embodiment of any of the foregoing methods includes communicating gas through an interior of the cage member to an interior of the inflatable device to transition the inflatable device from the less expanded position to the more expanded position.

In a further non-limiting embodiment of any of the foregoing methods, the cage member includes no door panel and no window glass such that the door opening includes no door panel and no window glass when the side door is detached from the vehicle and replaced with the cage member.

A further non-limiting embodiment of any of the foregoing methods includes pivotably securing the cage member to a body structure of the vehicle.

A further non-limiting embodiment of any of the foregoing methods includes transitioning a deployable assembly from a stowed position to a deployed position. The deployable assembly spans from a front side of the door opening to a rear side of the door opening when in the deployed position. The inflatable device is secured to the deployable assembly and transitions with the deployable assembly from the stowed position to the deployed position.

In a further non-limiting embodiment of any of the foregoing methods, the deployable assembly in the stowed position is at least partially contained within a first recess opening to the front side or the rear side of the door opening, and the deployable assembly in the deployed position is at least partially received within both the first recess and a second recess. The second recess opening to the other of the front side or the rear side of the door opening.

A further non-limiting embodiment of any of the foregoing methods includes extending, relative to each other, a plurality of telescoping segments of the deployable member when transitioning the deployable member from the stowed position to the deployed position.

A further non-limiting embodiment of any of the foregoing methods includes communicating gas through the plurality of telescoping segments to an interior of the inflatable device to transition the inflatable device from the less expanded position to the more expanded position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to vehicle occupant protection. In particular, the disclosure is directed toward inflatable devices for use in vehicles having detachable doors. The inflatable devices can be deployed to protect an occupant when the doors are detached from the vehicle.

Figure 1:
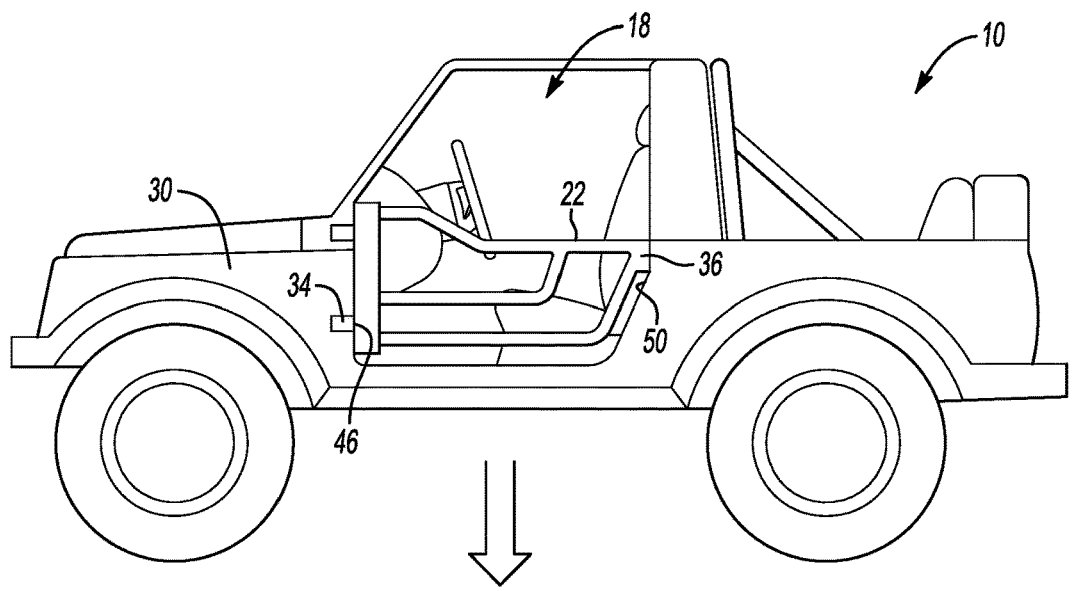
FIG. 1 illustrates a side view of a vehicle having detachable doors according to an exemplary aspect of the present disclosure with one of the detachable doors detached from the vehicle and replaced with a cage member having an inflatable device.
Figure 1:
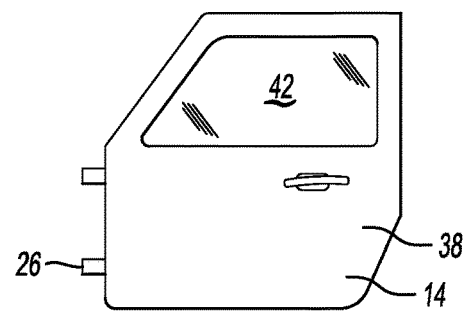
Figure 2:
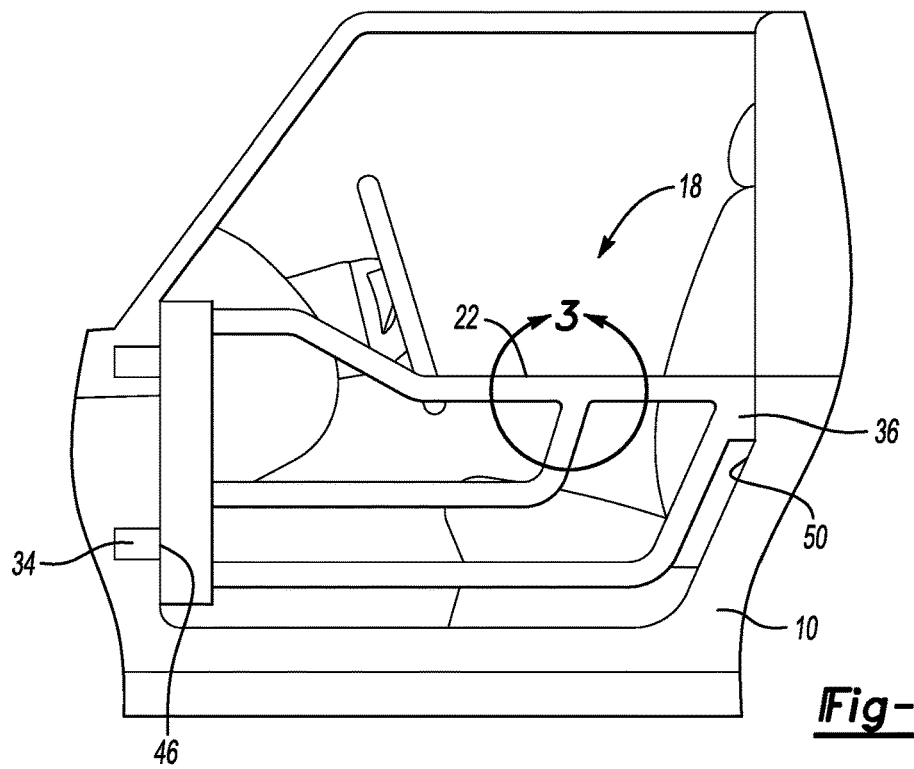
FIG. 2 illustrates a close-up view of a door opening and the cage member from the vehicle of FIG. 1.
Figure 3:
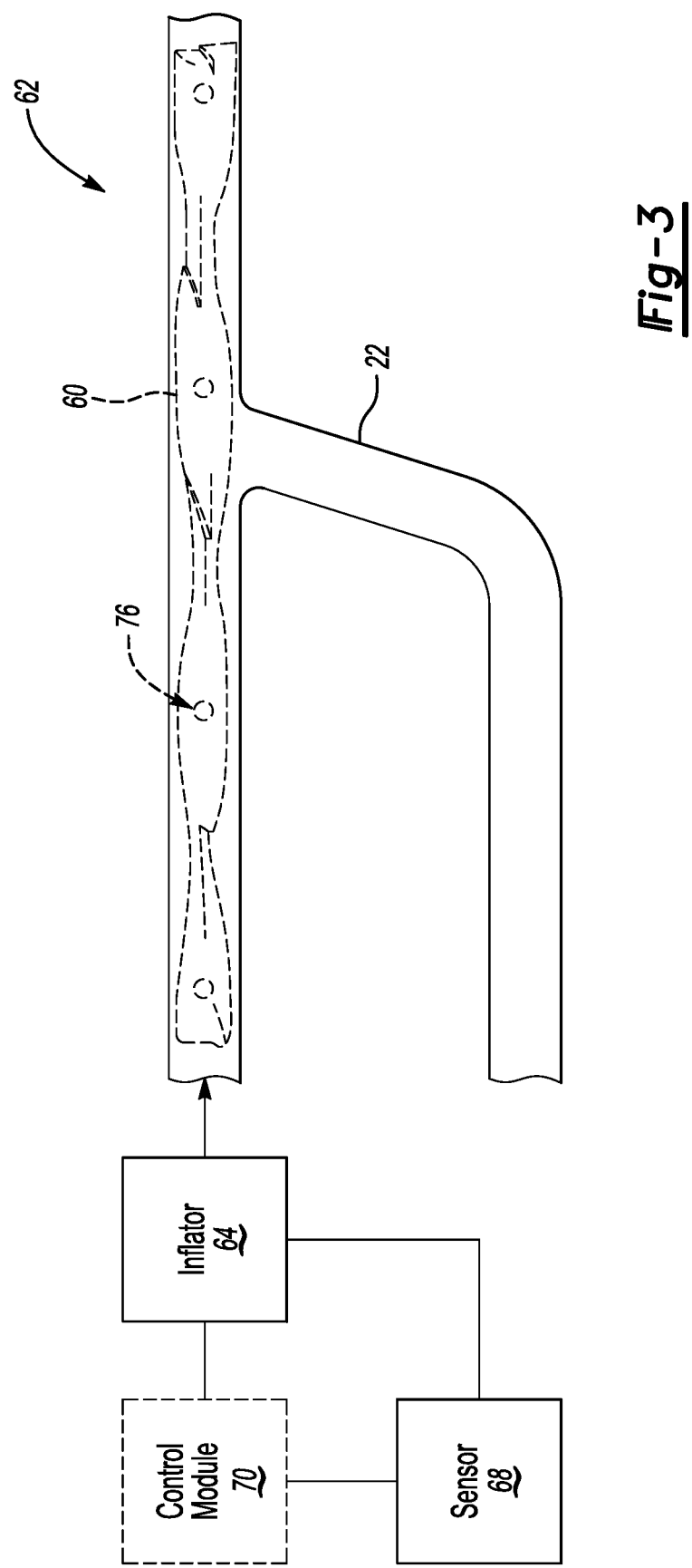
FIG. 3 illustrates a view of an Area 3 in FIG. 2.
Figure 4:
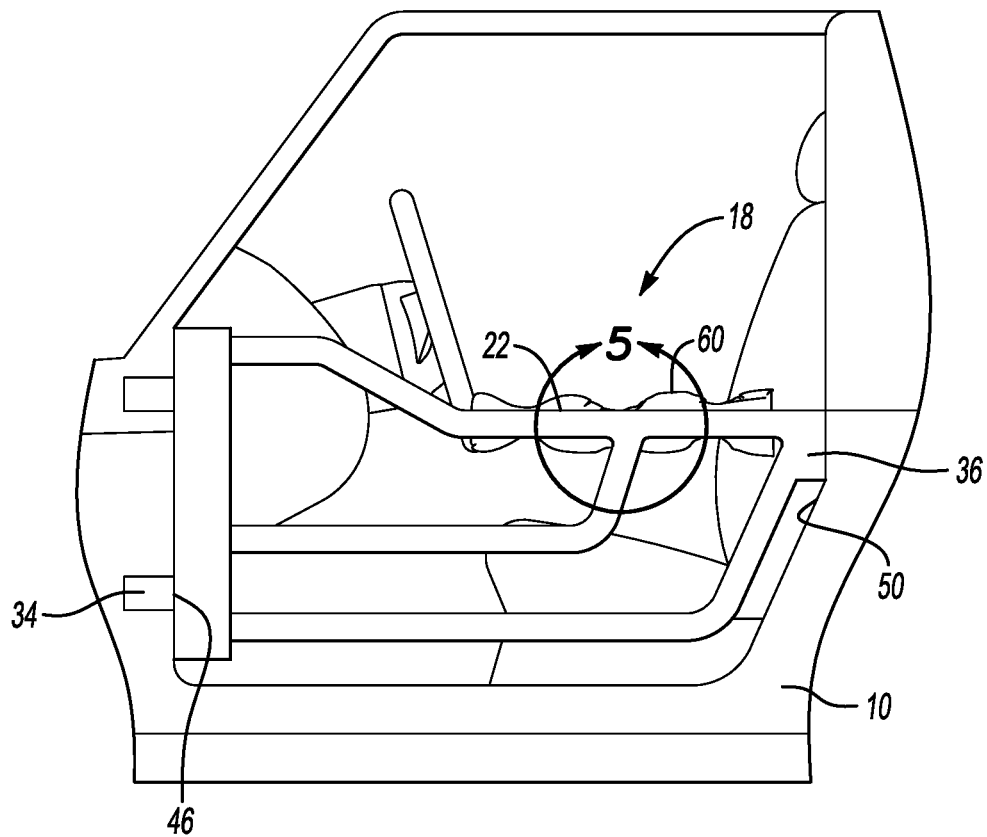
FIG. 4 illustrates the close-up view of FIG. 2 with the inflatable device in a more expanded position than FIG. 2.

Referring now to FIG. 1, a vehicle 10 includes detachable side doors. One of the side doors 14 is shown detached from the vehicle 10, which provides the vehicle 10 with a door opening 18. A cage member 22 is disposed within the door opening 18.

The doors 14 include hinges 26. When the doors 14 are secured to the vehicle 10, the hinges 26 pivotably secure the doors 14 to a vehicle body structure 30. Removing the doors 14 involves decoupling the hinges 26 from the vehicle body structure 30. The detachable doors 14 are side doors in this example.

The cage member 22 includes hinges 34. The cage member 22 can be pivotably secured to the vehicle body structure 30 via the hinges 34 when one of the doors 14 is detached from the vehicle 10. The cage member 22 can pivot about the hinges from the closed position shown in FIG. 1 to an open position to permit an occupant to enter the vehicle 10. A latch assembly 36 can be used to secure the cage member 22 to the vehicle body structure 30 in the closed position shown in FIG. 1.

The doors 14 includes door panels 38 and window glass 42. When the doors 14 are attached to the vehicle body structure 30, the door panels 38 and the window glass 42 can close off the door opening 18. The cage member 22 differs from the doors 14 because, among other things, the cage member 22 includes no door panels 38 or window glass 42. The cage member 22 is not a vehicle side door, but, instead, a member utilized to contain occupants of vehicle 10. The cage member 22 does not close off the door opening 18 as there are significant open areas extending through the cage member 22 from outside the vehicle 10 to inside a passenger compartment of the vehicle 10.

The cage member 22, in the exemplary embodiment, is in an arrangement of tubular structures having a cross-sectional diameter that is from one to three inches in this example. Other exemplary cage members suitable for use in connection with the vehicle 10 could include a chain, link, or rod.

The door opening 18 extends along a longitudinal axis of the vehicle 10 from a first side 46 to an opposite, second side 50. The first side 46 is a front side of the door opening 18 and provided by an area of the vehicle body structure 30 that is generally axially aligned with front hinge pillar of the vehicle 10. The second side 50 is a rear side of the door opening, and is provided by, generally, a B pillar of the vehicle 10. In this example, the hinges 34 attached the cage member 22 to the first side 46, and the latch assembly 36 attaches the cage member 22 to the second side 50.

With reference now to FIGS. 2-5, an inflatable device 60 is secured to the cage member 22. The inflatable device 60 can move from the less expanded position of FIGS. 2-3 to the more expanded position of FIGS. 4 and 5.

The inflatable device 60 and the cage member 22 together provide a vehicle assembly 62 that can help to protect the occupant of the vehicle 10 if the occupant is moved toward the cage member 22 during, for example, a collision involving the vehicle 10. The inflatable device 60 in the more expanded position provides a cushion or soft interface between the occupant and the cage member 22. The inflatable device 60 essentially damps an impact force between the occupant and the cage member 22 to reduce the effect of the impact force on the occupant.

When in the less expanded position and viewed from outside the vehicle 10 as shown, the inflatable device 60 is hidden behind the cage member 22. In the more inflated position of FIGS. 4 and 5, the inflatable device 60 expands to cushion an impact load of the occupant against areas of the cage member 22. The less expanded position can include a position where the inflatable device 60 is not expanded at all. The more expanded position can include a positon where the inflatable device is fully expanded.

The inflatable device 60 can be inflated by an inflator 64 which responds to an input from a sensor system 68. In response to the vehicle 10 being involved in a collision, for example, the sensor system 68 can trigger the inflator 64 to inflate the inflatable device 60. The sensor system 68 could include sensors that detect whether or not the side door 14 is removed from the vehicle 10, as well as accelerometers, cameras, etc., used to detect the vehicle 10 being involved in an impact event where inflating the inflatable device 60 is desired. The sensor system 68 could instead, or additionally, include impact sensors, occupant classification system sensors, safety belt sensors, which can assist with classifying a status and position of an occupant within the vehicle 10 and seat positioning.

A control module 70 of the vehicle 10 could instead, or additionally, be used to initiate movement of the inflatable device 60 from the less expanded position to the more expanded position. The control module 70 could include a plurality of individual modules and could receive an input from the sensor system 68. The control module 70 could execute programs that can be used in connection with the sensor system 68 to detect an impact and establish a severity of the impact.

The control module 70, in an exemplary embodiment, can include a processor, memory, and one or more input and/or output (I/O) device interface(s) that are communicatively coupled via a local interface. The local interface can include, for example but not limited to, one or more of the buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The control module 70 can include a hardware device for executing software, particularly software stored in memory that may include one or more separate programs, each of which includes an ordered listing of executable instructions for implementing logical functions. The control system can be a custom made or commercially available processor, a central processing unit (CPU), an auxiliary processor among several processors associated with the computing device, a semiconductor based microprocessor (in the form of a microchip or chip set) or generally any device for executing software instructions. The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.).

In response to initiation by the sensor system 68, the control module 70, or both, the inflator 64 can generate gas to inflate the inflatable device 60. The inflator 64 can, in some examples, react sodium azide (NaN3) with potassium nitrate (KNO3) to produce nitrogen gas, which is then moved to an interior of the inflatable device 60 to cause the inflatable device 60 to move to the more expanded position. The gas could be compressed air or a heated gas such as argon in other examples.

Figure 6:
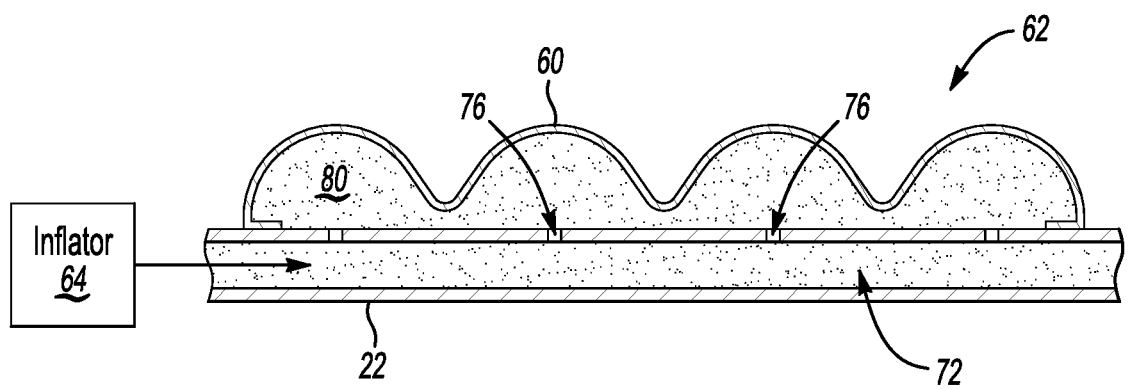
FIG. 6 illustrates a section view taken at line 6-6 in FIG. 5.
Figure 5:
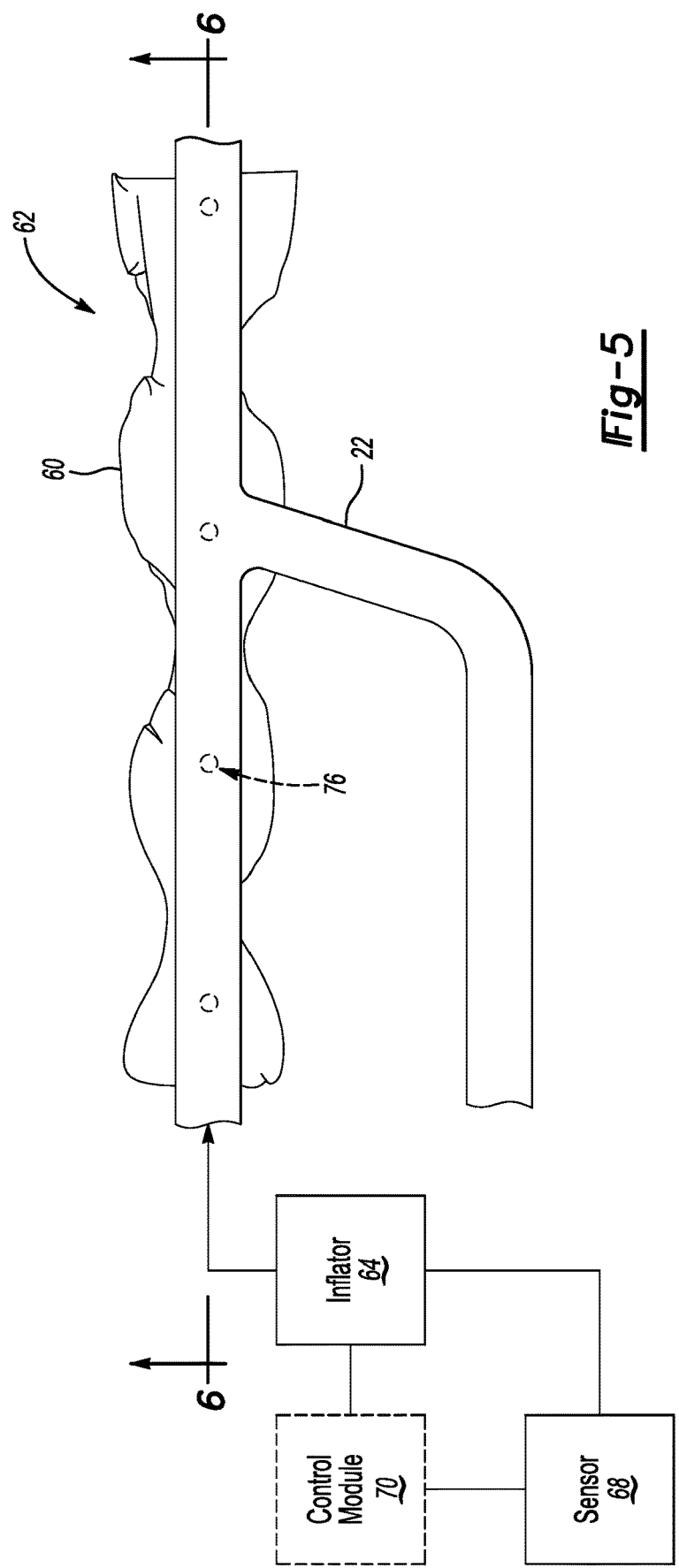
FIG. 5 illustrates a view of an Area 5 FIG. 4.

With reference to FIG. 6, in this example, gas moves from the inflator 64 to an interior area 72 of the cage member 22. The gas then passes through openings 76 within the cage member 22 and into an interior area 80 of the inflatable device 60. The cage member 22 thus provides a conduit that conveys gas to the interior area 80 of the inflatable device 60.

The inflatable device 60 can be a fabric or nylon for example. Vents could be incorporated into the areas of the inflatable device 60 to provide a desired profile when in the more inflated position.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

Figure 7:
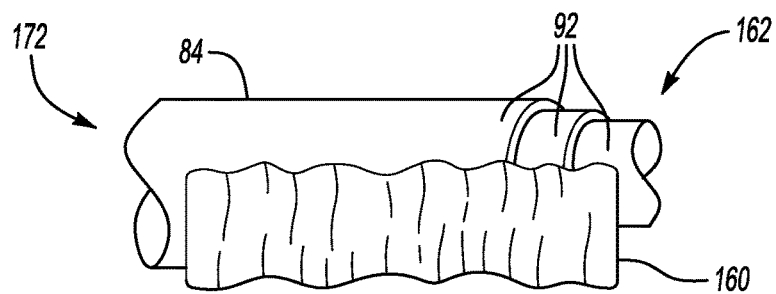
FIG. 7 illustrates a side view of a vehicle assembly having an inflatable device in a less expanded position according to another exemplary aspect of the present disclosure.
Figure 8:
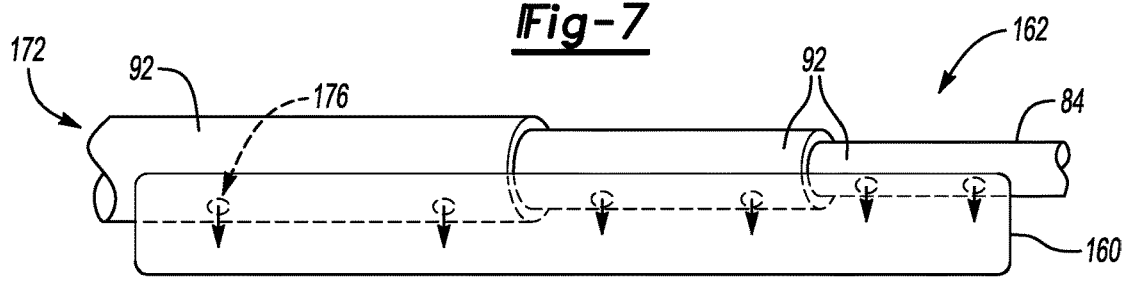
FIG. 8 illustrates a top view of the vehicle assembly of FIG. 7 with the inflatable device in a more expanded position and a deployable assembly of the vehicle assembly in a deployed position.
Figure 9:
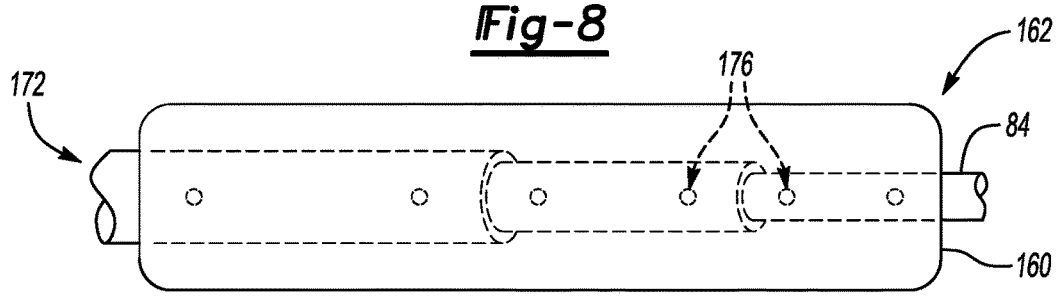
FIG. 9 illustrates a side view of the vehicle assembly of FIG. 8 with the inflatable device in the more expanded position and the deployable assembly of the vehicle assembly in the deployed position.

With reference now to FIGS. 7-9, a vehicle assembly 162 according to another exemplary aspect of the present disclosure includes an inflatable device 160 and a deployable assembly 84. The inflatable device 160 is moveable from the less expanded position of FIG. 7 to the more expanded position of FIGS. 8 and 9. The deployable assembly 84 is moveable from the stowed position of FIG. 7 to the deployed position of FIGS. 8 and 9. The vehicle assembly 162 can be considered a passive system, whereas the vehicle assembly 62 of FIGS. 1-6 can be considered an active system.

Figure 10:
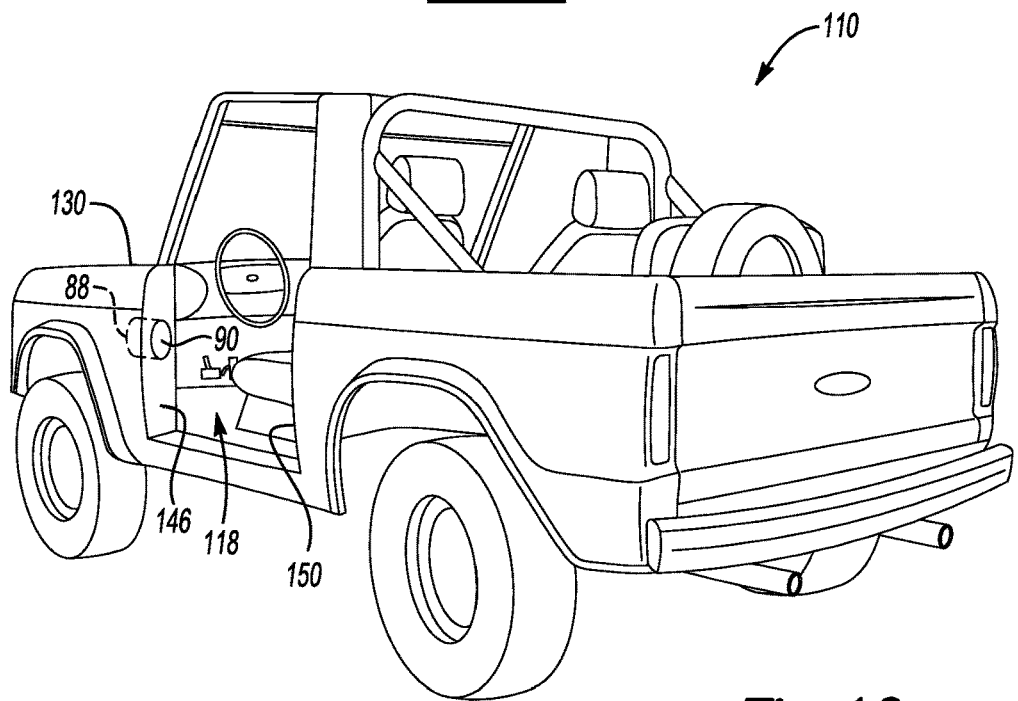
FIG. 10 illustrates a perspective view of a door opening in a vehicle having detachable doors and incorporating the vehicle assembly of FIG. 7.
Figure 11:
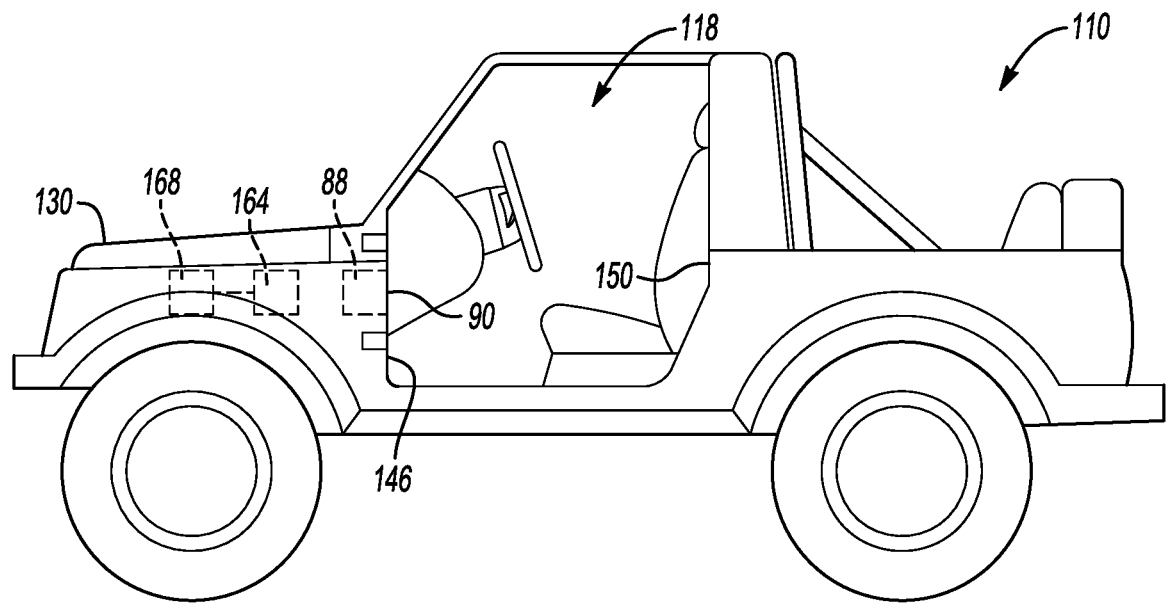
FIG. 11 illustrates a side view of the vehicle of FIG. 10.
Figure 12:
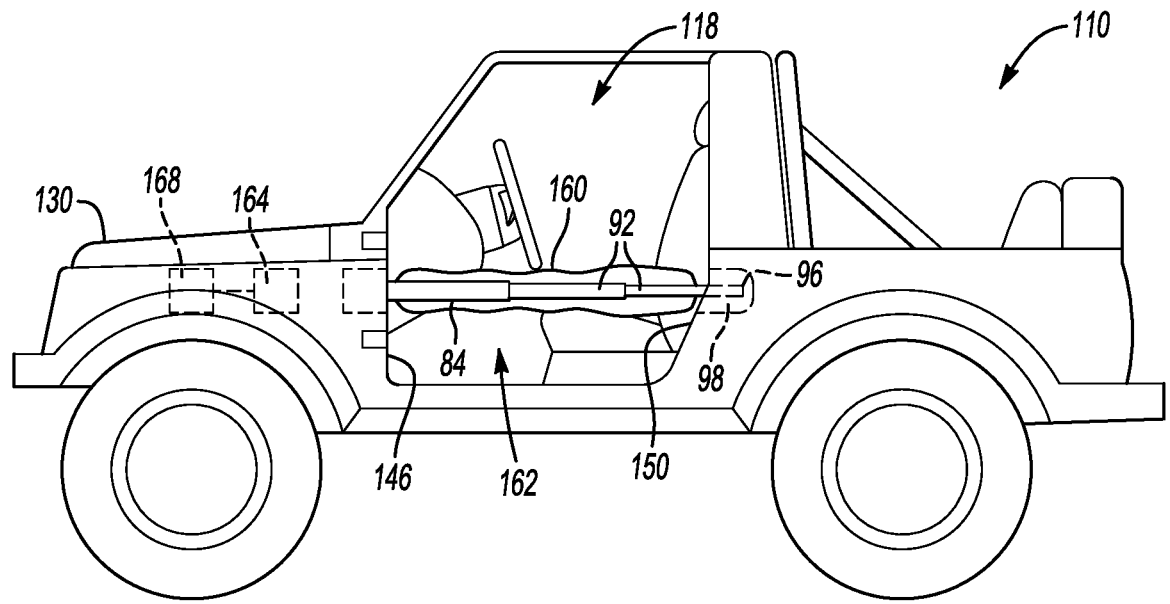
FIG. 12 illustrates the side view of FIG. 8 with the deployable assembly of the vehicle assembly in the deployed position and the inflatable device a more expanded position.

With reference now to FIGS. 10-12 and continuing reference to FIGS. 7-9, the vehicle assembly 162 can be used in connection with a vehicle 110. After a door has been detached from a vehicle 110, the vehicle 110 includes a door opening 118. The vehicle 110 does not include a cage member within the door opening 118.

During ordinary operation of the vehicle 110, the vehicle assembly 162 is housed within a first recess 88 within a body structure 130 of the vehicle 110. When housed within the first recess 88, the vehicle assembly 162 is in the position of FIG. 7 where the inflatable device 160 is in the less expanded position and the deployable assembly 84 is in the stowed position.

The first recess 88 opens to a first side 146 of the door opening 118. Although the exemplary embodiment includes the first recess 88 opening to the first side 146, the first recess 88 could be positioned elsewhere within the vehicle 110, such as in a position where the first recess 88 opens to a second side 150 of the door opening 118. The vehicle assembly 162 can be covered within the first recess 88 by a lid 90 hingeably attached to the body structure 130 of the vehicle 110.

The vehicle 110 includes an inflator 164 and the sensor system 68. The inflator 164 can, in response to a signal or command from the sensor system 168, ignite to inject gas into the deployable assembly 84 and the inflatable device 160.

The sensor system 168 can be configured such that the inflator 164 ignites only when the associated detachable door has been detached from the vehicle 110. That is, when the vehicle 110 is operated with the associated detachable door attached to the vehicle 110, the vehicle assembly 162 remains within the first recess 88. The sensor system 168 could, for example, comprises a pressure sensitive sensor that is only activated when the associated detachable doors has been detached from the vehicle 110.

The gas, in this example, passes through an interior area 172 of the deployable assembly 84 causing the deployable assembly 84 to move from the stowed position of FIGS. 7, 10, and 11 to the deployed position of FIGS. 8, 9, and 12. Movement of the deployable assembly 84 to the deployed position forces open the lid 90.

The deployable assembly 84 comprises, in this example, a plurality of individual segments 92 that are telescopically received within one another when in the stowed position. Gas moving into the interior area 172 of the deployable assembly 84 cause the segments 92 to extend relative to one another, which moves the deployable assembly 84 to the deployed position. The segments 92 could be metal, metal-alloy, carbon fiber, or some other material composition.

The inflatable device 160 is directly connected to the segments 92. From the interior area 172 of the deployable assembly 84, the gas passes through openings 176 into an interior of the inflatable device 160, which causes the inflatable device 160 to transition from the less expanded position to the more expanded position.

When the deployable assembly 84 is in the deployed position, an end 96 of the deployable assembly 84 can fit within a second recess 98 of the body structure 130. The second recess 98 opens to the second side 150 of the door opening 118 in this example. Fitting the end 96 within the second recess 98 can help to secure the deployable assembly 84 in the deployed position.

When the end 96 is received within the second recess 98, the deployable assembly 84 spans across the door opening 118 from the first side of the door opening 118 to the opposite, second side 150 of the door opening 118.

In some examples, the inflator 164 includes an inflator and ignitor for moving the deployable assembly 84 to the deployed positon, and a separate inflator and ignitor for moving the inflatable device to the more inflated position after the deployable assembly 84 is in the deployed position. Such examples could be considered a two-stage, or dual stage, deployment and inflation.

Figure 13:
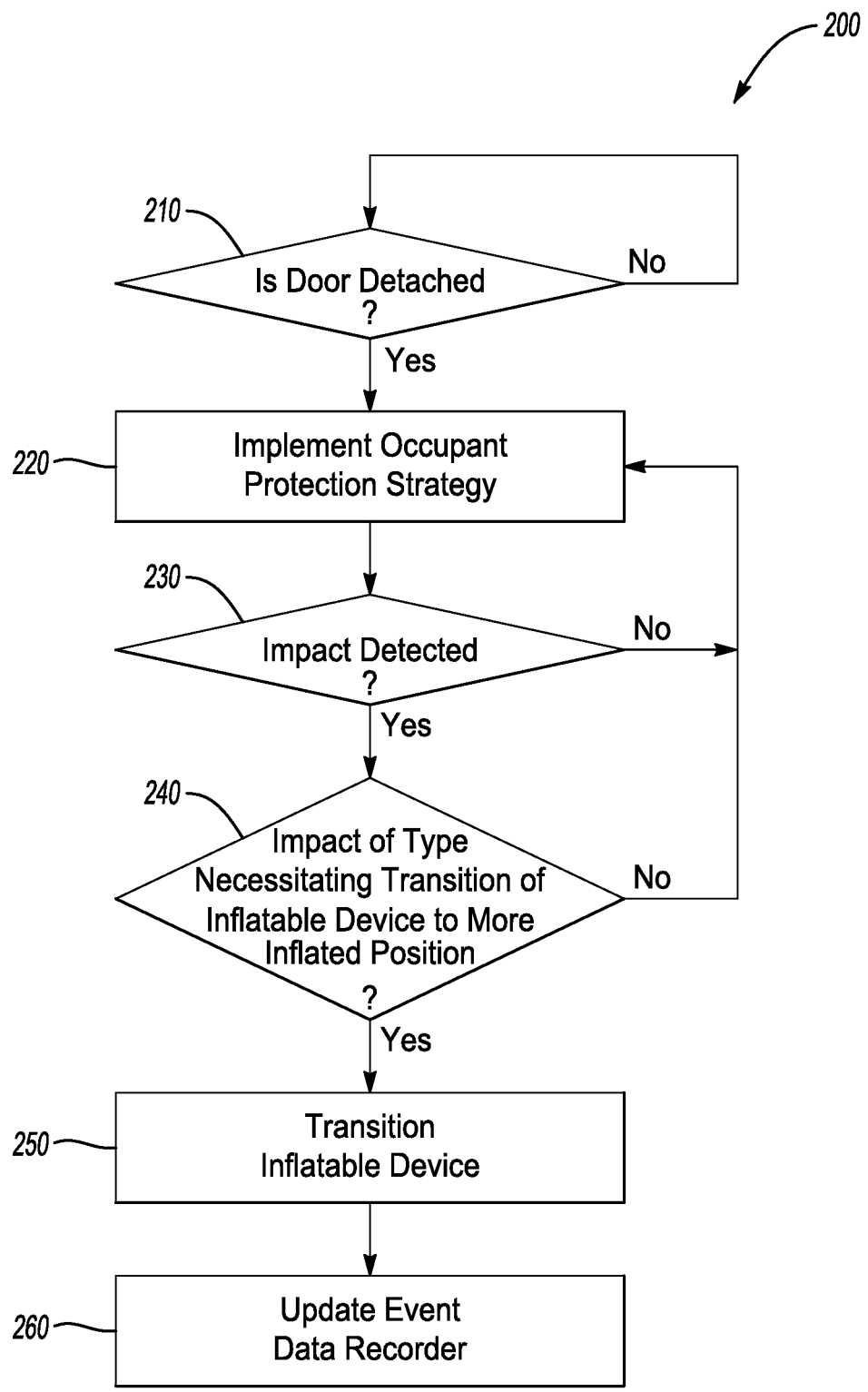
FIG. 13 illustrates the flow of an exemplary occupant protection method utilizing one of inflatable devices of FIGS. 1-12.

With reference to FIG. 13, an exemplary occupant protection method 200 can be utilized in connection with the vehicle assembly 62 of the embodiment of FIGS. 1-6 or the vehicle assembly 162 of the embodiment of FIGS. 7-12. At a step 210, the method identifies if a detachable door of a vehicle has been detached from the vehicle. The step 210 could identify this state utilizing a body control module (BCM), door ajar switches, cameras, connectors, other diagnostic information, etc. If not, the vehicle assemblies are not utilized for occupant protection.

If the detachable door has been detached, the method 200 moves from the step 210 to a step 220 where an occupant protection strategy using the vehicle assembly 62 or the vehicle assembly 162 for the associated door opening is implemented.

At a step 230, the method 200 monitors for an impact load on the vehicle. If an impact is detected, the method moves to a step 240, which assesses whether the impact is of the type where moving the inflatable device 60 or the inflatable device 160 to the more inflated position is desired.

If movement to the more inflated position is desired, the method 200 moves to a step 250. At the step 250, if the method 200 is used with the inflatable device 60, the inflatable device 60 is moved to the more inflated position. At the step 250, if the method 200 is used with the inflatable device 160 the deployable assembly 84 is deployed and the inflatable device 160 is moved to the more inflated position. The deployable assembly 84 could be deployed as a first stage, and the inflatable device 160 then moved to the more inflated position as a second stage after, say, 5 milliseconds from deployment of the deployable assembly 84.

At a step 260, the method 200 then updates an event data recorder of the vehicle to capture data associated with the movement of the inflatable device to the more inflated position.

A feature of the disclosed embodiments include cushioning an occupant moving toward a door opening during an vehicle impact when a detachable door formerly received within the door opening of the vehicle has been detached from the vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
an inflatable device that transitions between a less expanded position and a more expanded position, the inflatable device in the more inflated position disposed within a door opening area of a vehicle, a door of the vehicle detached from the vehicle to provide the door opening area.

2. The vehicle assembly of claim 1, wherein the inflatable device is mounted to a cage member that span from a front of the door opening area to a rear of the door opening area.

3. The vehicle assembly of claim 2, wherein the cage member includes no door panel and no window glass such that the door opening area includes no door panel and no window glass when the side door is detached from the vehicle and replaced with the cage member.

4. The vehicle assembly of claim 2, wherein the cage member is a chain or a bar.

5. The vehicle assembly of claim 2, wherein a plurality of openings in the cage member open to a plurality of openings in the inflatable device to provide a plurality of paths for communicating a gas to an interior of the inflatable device to transition the inflatable device from the less expanded position to the more expanded position.

6. The vehicle assembly of claim 1, further comprising a deployable assembly that transitions from a stowed position to a deployed position, the deployable assembly spanning from a front side of the door opening area to a rear side of the door opening area when in the deployed position, the inflatable device secured to the deployable assembly and configured to transition with the deployable assembly from the stowed position to the deployed position.

7. The vehicle assembly of claim 6, wherein the deployable assembly in the stowed position is at least partially housed within a first recess on one of the front side or the rear side, and the deployable assembly in the deployed position is and least partially received within a second recess on the other of the front side or the rear side.

8. The vehicle assembly of claim 7, further comprising a lid that covers the deployable assembly and the inflatable device within the first recess when the deployable assembly is in the stowed position.

9. The vehicle assembly of claim 6, wherein the deployable assembly is a telescoping assembly comprising a plurality of segments that extend relative to each other as the deployable assembly moves from the stowed position to the deployed position, the inflatable device secured to each of the plurality of segments.

10. The vehicle assembly of claim 6, wherein a plurality of openings in the deployable assembly open to a plurality of openings in the inflatable device to provide a plurality of paths for communicating a gas to an interior of the inflatable device to transition the inflatable device from the less expanded position to the more expanded position.

11. An occupant protection method, comprising:
after a side door of a vehicle is detached from the vehicle to provide a door opening, transitioning an inflatable device from a less expanded position to a more expanded position, the inflatable device in the more inflated position disposed within the door opening.

12. The occupant protection method of claim 11, wherein the inflatable device is mounted to a cage member that spans from a front of the door opening to a rear of the door opening.

13. The occupant protection method of claim 12, further comprising communicating gas through an interior of the cage member to an interior of the inflatable device to transition the inflatable device from the less expanded position to the more expanded position.

14. The occupant protection method of claim 12, wherein the cage member includes no door panel and no window glass such that the door opening includes no door panel and no window glass when the side door is detached from the vehicle and replaced with the cage member.

15. The occupant protection method of claim 14, further comprising pivotably securing the cage member to a body structure of the vehicle.

16. The occupant protection method of claim 11, further comprising transitioning a deployable assembly from a stowed position to a deployed position, the deployable assembly spanning from a front side of the door opening to a rear side of the door opening when in the deployed position, the inflatable device secured to the deployable assembly and transitioning with the deployable assembly from the stowed position to the deployed position.

17. The occupant protection method of claim 16, wherein the deployable assembly in the stowed position is at least partially contained within a first recess opening to the front side or the rear side of the door opening, and the deployable assembly in the deployed position is at least partially received within both the first recess and a second recess opening to the other of the front side or the rear side of the door opening.

18. The occupant protection method of claim 16, further comprising extending, relative to each other, a plurality of telescoping segments of the deployable member when transitioning the deployable member from the stowed position to the deployed position.

19. The occupant protection method of claim 18, further comprising communicating gas through the plurality of telescoping segments to an interior of the inflatable device to transition the inflatable device from the less expanded position to the more expanded position.

* * * * *

UNITED STATES PATENT AND TRADEMARK OFFICE
CERTIFICATE OF CORRECTION

Page 1 of 1

PATENT NO. : 10,501,043 B2
APPLICATION NO. : 15/899000
DATED : December 10, 2019
INVENTOR(S) : Mahmoud Yousef Ghannam, Mohamed Riha Baccouche and Saied Nusier It is certified that error appears in the above-identified patent and that said Letters Patent is hereby corrected as shown below:

In the Claims

In Claim 1, Column 8, Line 8; replace "in the more inflated position" with --in the more expanded position--

In Claim 7, Column 8, Line 40; replace "is and least" with --is at least--

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*